(12) United States Patent
Pelletier (10) Patent No.: US 7,362,858 B2
(45) Date of Patent: Apr. 22, 2008

(54) HIGH-SPEED TELEPHONE CONNECTION

(75) Inventor: Dale T. Pelletier, Colorado Springs, CO (US)

(73) Assignee: TeleMatrix, Inc., Colorado Springs, CO (US)

( * ) Notice: Subject to any disclaimer, the term of this patent is extended or adjusted under 35 U.S.C. 154(b) by 569 days.

(21) Appl. No.: 10/703,276

(22) Filed: Nov. 7, 2003

(65) Prior Publication Data

US 2005/0100146 A1    May 12, 2005

(51) Int. Cl.
*H04M 1/00* (2006.01)
*H04M 9/00* (2006.01)

(52) U.S. Cl. ............. 379/438; 381/433.05; 381/428.03

(58) Field of Classification Search ................ 379/422, 379/423, 428.03, 434, 438, 433.05, 1–32; 439/638, 676, 941
See application file for complete search history.

(56) References Cited

U.S. PATENT DOCUMENTS

| | | | |
|---|---|---|---|
| 4,124,879 A | 11/1978 | Schoemer | |
| 4,595,800 A | 6/1986 | Nagatomi et al. | |
| 4,776,120 A | 10/1988 | Utoh et al. | |
| 5,130,897 A | 7/1992 | Kuzma | |
| 5,153,590 A | 10/1992 | Charlier | |
| 5,153,906 A | 10/1992 | Akiyama | |
| 5,409,239 A | 4/1995 | Tremmel | |
| 5,535,262 A | 7/1996 | Kanzawa | |
| 5,586,172 A | 12/1996 | Sakurai et al. | |
| 5,938,772 A | 8/1999 | Welch | |
| 5,952,731 A | 9/1999 | McPherson et al. | |
| 6,031,465 A | 2/2000 | Burgess | |
| 6,223,233 B1 | 4/2001 | Kavanaugh et al. | |
| 6,848,947 B2 * | 2/2005 | Chimiak | 439/638 |
| 2004/0028192 A1 | 2/2004 | Pelletier | |

* cited by examiner

*Primary Examiner*—Curt Kuntz
*Assistant Examiner*—Tuan D Nguyen
(74) *Attorney, Agent, or Firm*—Fish & Richardson P.C.

(57) ABSTRACT

A data communication device comprises a data input cable, a data output cable, and a selective connector. The data input cable has a first plurality of data lines arranged in a first order. The data output cable has a second plurality of data lines arranged in a second order that differs from the first order. The selective connector is configured to transmit a plurality of signals carried by the plurality of data lines in the data input cable to corresponding data lines of the data output cable.

21 Claims, 6 Drawing Sheets

HIGH-SPEED TELEPHONE CONNECTION

BACKGROUND

This invention relates to telephone sets, and more particularly to a telephone set that allows users to connect to a local area network.

In today's global marketplace, the average businessperson must travel more frequently to meet customers' needs. Travelers often need a quiet place to work while away from their office. Many work in their hotel room. In addition to increased travel, this age benefits from major improvements in the way people communicate. The internet, high-speed internet in particular, allows people to communicate more information with more people in more locations than anyone could have imagined even a quarter century ago. Businesspeople must harness this communication capacity or be left behind.

At the intersection of both of these modern realities is businesspeople being able to access the internet from their hotel rooms. Before high-speed internet, travelers who wished to access the internet from their hotel room simply plugged their laptop into the phone and dialed in to a service provider. People became familiar with this process.

Now, most hotel chains that cater to business travelers provide high-speed internet access by creating local area networks. Each room has a jack that allows the occupant to plug his or her laptop into the local area network. The high-speed jacks are often inconvenient to use, however. For example, the jack might be in the wall where it is difficult to find or reach, and where a cord cannot easily reach it. Some have solved this problem by placing the jack in a box on the hotel room desk. But this solution simply adds another piece of clutter to get in the traveler's way, and also adds expense for the hotel.

SUMMARY

This document discloses an apparatus and system for providing high-speed data access via a port located on a standard telephone set. In addition, the document discloses features that allow the enabling of the high-speed data access capability in a simple but controlled manner.

In one embodiment, a data communication device for use with a telephone is disclosed. The device comprises a data input cable having a first plurality of data lines arranged in a first order, a data output cable having a second plurality of data lines arranged in a second order that differs from the first order, and a selective connector configured to transmit a plurality of signals carried by the plurality of data lines in the data input cable to corresponding data lines of the data output cable. A data output jack, such as a female RJ-45 connector, may be provided in electrical communication with the data output cable, and a data input jack, such as a female RJ-45 connector, may be provided in electrical communication with the data input cable. Knockout panels may also be provided in a telephone housing over one or both jacks. A receptacle, which may be accessible from a top surface of the telephone, may also be provided in electrical communication with the data input cable and the data output cable, and may be adapted to receive the selective connector.

In some embodiments, a network switch may be mounted in the telephone in electrical communication with the data input cable and with the data output cable, and may be configured to pass data intended for the data output cable to the data output cable. The switch may comprise a hub, or may selectively pass data to the data output cable. In addition, a voice over IP controller mat be provided in communication with the switch, and both the switch and the controller may be located on a single chip.

In another embodiment, a telephone set is disclosed. It comprises a main unit having a telephone housing, a hand set, a data input cable, a data output port, and a receptacle configured to receive a selective connector in electrical communication with the data input cable and the data output port, and to connect data lines from the data input cable arranged in a first order, to corresponding matched data lines from the data output port arranged in a second order that differs from the first order. The receptacle may be accessible through a passage formed in a top surface of the housing. In addition, a message alert and retrieval device may be mounted in the housing, and may combine into a single apparatus a message key adapted to permit one-touch message retrieval, and a light source that indicates when a message is waiting.

In yet another embodiment, a selective connector for use with a data networking device is provided. The selective connector may comprise a substrate, a first plurality of conductors arranged in a first order on the substrate, a second plurality of conductors arranged on the substrate in a second order that differs from the first order, and a conductor cross-over that connects each of the first plurality of conductors to matched corresponding conductors in the second plurality of conductors. The substrate may have a first substantially planar surface supporting the first plurality of conductors and a second substantially planar surface opposed to the first surface supporting the second plurality of conductors, and may also have vias connecting the first plurality of conductors to the second plurality of conductors. Also, the substrate may have a first substantially planar surface and the first plurality of conductors and second plurality of conductors may be located on the first surface. In one embodiment, the substrate may be sized to fit inside an RJ-45 jack, and the second plurality of conductors may be configured to contact corresponding conductors of an RJ-45 plug.

Thus, users can achieve a high-speed internet connection by placing their laptop in electrical communication with their telephone set. This conforms to users' established customary practices and keeps them from having to search for the local area network jack on the wall. Further, it is preferable to any attempt to extend the jack to a more accessible stand-alone structure in that it conserves space. The selective connector gives consumers the option of purchasing a telephone set that does not have high-speed internet capability for a lower price, and to later enable the high-speed capability when it is desired. The system also allows a manufacturer to provide phones having and lacking high-speed capability without having to manufacture and stock two separate sets of phone, and to allow customers to upgrade phones easily, but in a controlled manner, in the field. Alternatively, the manufacturer can easily enable the high-speed capability prior to shipping the telephone.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
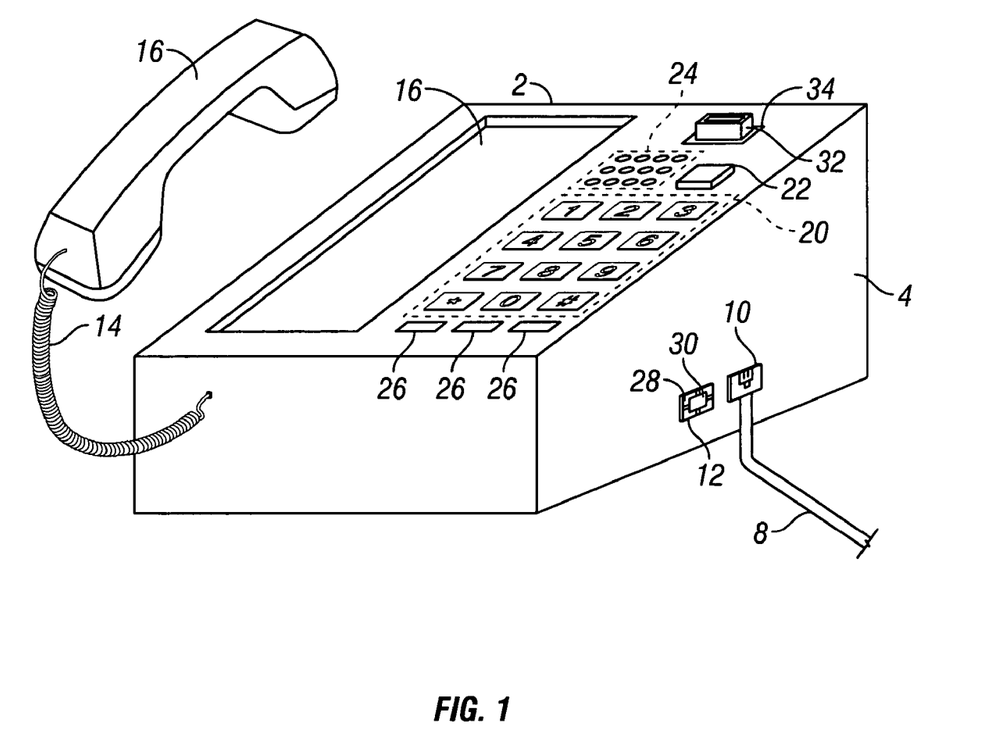
FIG. 1 shows a perspective view of a telephone set.

FIG. 1 is a perspective view of a telephone set. Telephone set 2 may include main unit 4 and hand set 6. Main unit 4 may be an enclosed structure that contains the components of telephone set 2, and may be produced by any appropriate means, such as by plastic injection molding. Hand set 6 may be connected to main unit 4 by way of cord 14, which may be manufactured from any appropriate flexible, yet durable, material. Alternatively, hand set 6 may be wireless, and may be provided with a transceiver to communicate with main unit 4, which may be provided with a corresponding transceiver. Main unit 4 may also be provided with hand set cradle 16 to receive hand set 6. In addition, main unit 4 may have a speaker (not shown) so that user can be given the option to communicate without using hand set 6.

Main unit 4 may also be provided with various keys and indicators for operating telephone set 2. Keypad 20 may be arranged as a standard dual tone multifrequency (DTMF) keypad. Keypad 20 be formed as a standard nine-key dialing pad, and may generate control signals to send to a call management interface (not shown), which may be part of a private branch exchange or a telephone switching station, and which can interpret control signals, such as tones, from telephone set 2 and provide appropriate services in response. Telephone set 2 may also be configured as a voice over IP telephone, so that the call management interface is part of a broader voice over IP system. The dialing and call management for telephone set 2 may be carried out in any appropriate manner as would be well understood to a skilled artisan.

Keypad 20 may be connected to a dialing interface (not shown) inside telephone set 2. The dialing interface may comprise circuitry or software required to convert signals generated by actuation of keys on telephone set 2 into usable control signals. For example, the dialing interface could comprise discrete oscillator components for generating DTMF tones or could comprise integrated circuits for producing DTMF tones. The dialing interface may also be integrated with other functions of telephone set 2, such as a speech circuit, which may be implemented on an integrated circuit, such as a Motorola MC34014. The dialing interface may also be connected to an electronic memory (not shown), e.g., EEPROM, that may retain one or more phone numbers so that a single touch of a key on a keypad sends an entire telephone number to a call management interface. Furthermore, many features may be integrated into a single microprocessor, such as a Texas Instruments TMS7000 or a Motorola MC6800, that executes program code stored in the memory.

The dialing interface, speech interface, and memories may be powered from an attached telephone line of data line (such as CAT3 or CAT5 cable), and may be protected from voltage transients on the telephone line by appropriate circuitry. The interfaces and memories may alternatively be powered by local power, such as battery power or local power from a wall outlet.

As an alternative to keypad 20, main unit 4 may be provided with a pulse dialing mechanism. A pulse dialing mechanism represents a dialed number by a series of discrete pulses rather than by a pair of tones. Telephone set 2 may be provided with both pulse and tone dialing functionality with a combination dialing circuit, such as a circuit from the Motorola MC145412/13/512 family, or through any other appropriate means of providing dialing functionality to telephone set 2. In addition to dial tones and pulses, the dialing interface may communicate using various other control signals, whether analog or digital.

Telephone set 2 may also be provided with additional functionality using function keys 26. For example, function keys 26 may be programmed to initiate common tasks, such as placing a call on hold, initiating a conference call, or transferring a call. Function keys 24 may provide even further functionality. For example, function keys 24 may be programmed to dial frequently-called numbers. Function keys 24 could be programmable by the user so that the user may select and update the telephone numbers dialed by each key. Keys such as function keys 24 may be referred to as speed-dial buttons.

Telephone set 2 may also be provided with message alert key 22. Message alert key 22 is an apparatus which may exhibit dual functionality. Message alert key 22 may be configured to provide access to a messaging center and contain a light source 48 (FIG. 2) that provides visible light to a visible portion of message key 22. Light source 48 may be responsive to a signal from a messaging center that indicates when messages are waiting for the user of telephone set 2. Thus, not only may the message alert key 22 provide visual notification that messages are waiting, but it may also receive a command from the user to retrieve the messages. In this way, a user need only touch the light to retrieve messages. Such a feature is particularly advantageous in hospitality (e.g., hotel) applications, where light is typically low and the user is not familiar with the particular telephone set.

Telephone set 2 may be provided with one or more data ports. For example, dial-up data port 10 can be provided to give normal dial-up access through telephone set 2. Dial-up data port 10 may be, for example, a female RJ-11 jack, which is generally used for telephone communication in the U.S. High-speed port 12 may provide for high-speed connection and comprise an RJ-45 jack, which is generally associated with Ethernet communication. Both jacks are configured to receive corresponding male plugs, such as from an Ethernet or telephone patch cord that can be attached to a portable computer used by a traveler. The dial-up port 10 may also be eliminated if only high-speed connections are desired, such as in a voice over IP phone.

A knockout panel 30 may be provided over the high-speed port 12, to limit access to high-speed port 12 and to indicate that high-speed port 12 is not currently usable. Knockout panel 30 may attach to a surface of telephone set 2 by a plurality of tabs 28. Tabs 28 may be made of the same or similar material as main unit 4. Tabs 28 may provide for easy detachment by having a thickness less than that of the remainder of the wall of main unit 4, a width that is narrow in comparison to the length of the side of knockout 30 to which it is attached, or both. Knockout panel 30 can be easily removed by a user to expose high-speed port 12, such as by prying knockout panel with a screwdriver, knife, or other appropriate tool. On the other hand, if the consumer does not wish to expose high-speed port 12, he or she may leave knockout panel 30 intact, protecting the components contained in main unit 4 from dust and other contaminants that may be harmful, and indicating to users such as travelers that the high-speed port 30 is not to be used.

A passage 34 may be provided in the top surface of telephone set 2 to allow access by a consumer to a receptacle 32. The consumer may insert a key (not shown), such as a flat printed circuit board having a number of conductive traces, into receptacle 32. As explained in more detail below, receptacle 32 may be attached to one or more data lines, such as twisted-pair wire, that are in communication with a input port on the back of the telephone set and one or more data lines connected to high-speed port 12. By inserting the key, the consumer can complete a connection between the ports so as to make high-speed access available from high-speed port 12. Also as explained in more detail below, the key can be provided with structure to provide a cross-over for one or more wires so that it does not simply act as a straight bridge, and so as to make it more difficult for pirates to steal the added functionality of a high-speed enabled telephone.

In general, receptacle 32 is located below the top surface of main body 4, and a key inserted into receptacle 32 will be located below the surface also, so that a consumer can cover the receptacle 32 with a printed paper that includes, for example, dialing information or other information.

Figure 2:
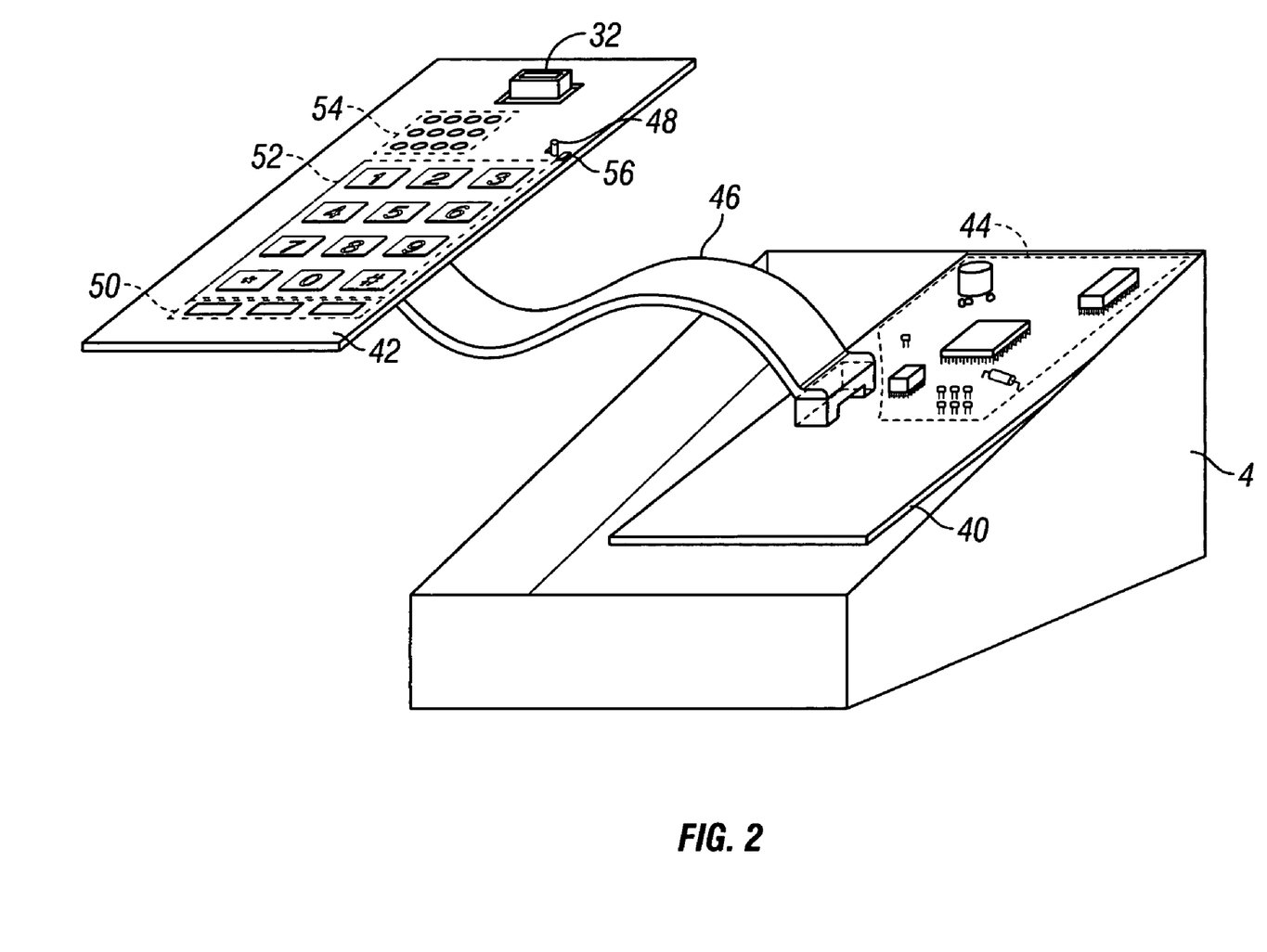
FIG. 2 shows the main unit with the top surface removed, allowing inspection of the inner components.

FIG. 2 shows main unit 4 with the top cover removed, allowing inspection of the inner components. The inner components are supported by main board 40 and keypad board 42, which may be connected by connector 46, such as a ribbon cable or other suitable connector. Main board 40 may be made of FR4 or other materials out of which printed circuit boards are typically made. Main board 40 may serve many purposes. For example, it may connect electronic components 44, which may include integrated circuits, resistors, transistors, diodes, capacitors, or other circuitry. Main board 40 may also serve as a mounting point for those components.

Keypad board 42 may also be made of FR4 or other materials out of which printed circuit boards are typically made. Like main board 40, keypad board 42 may serve many purposes. It may support various conducting pads that correspond to keypad 20, function keys 24, function keys 26, or other keys provided by telephone set 2. For example, conducting pads 50 correspond to function keys 26, such that when function keys 26 are depressed, a circuit becomes closed that signals the appropriate electronic components 44 which key was depressed. Similarly, conducting pads 52 correspond to keypad 20, and conducting pads 54 correspond to function keys 24. Although main board 40 and keypad board 42 are shown as two physically separate boards, it should be understood that any appropriate number or arrangement of components is permissible as required by the particular application.

Figure 3:
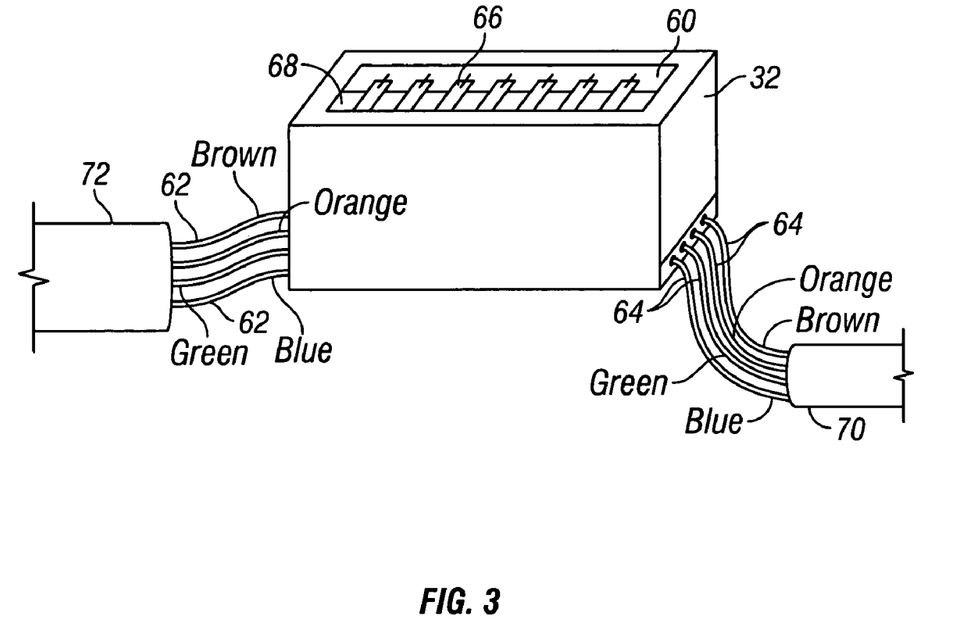
FIG. 3 shows a perspective view of the receptacle.

Keypad board 42 may support receptacle 32, which is discussed more thoroughly in FIG. 3. Keypad board 42 may also support conducting pads 56, one of which may correspond with message key 22. When message key 22 is depressed, contact is made with conducting pads 56, which close a circuit, sending a retrieval signal to a messaging center. Keypad board 42 may also support light source 48, which may be enclosed by message key 22. Light source 48 may be responsive to a signal from a messaging center (not shown) that indicates when messages are waiting for the user of telephone set 2. Light source 48 may comprise a light-emitting diode, a light-emitting diode with a light pipe assembly, a matrix display assembly, a light generator with a liquid crystal display element, or other appropriate structure for indicating when messages are waiting. Light source may also include a display that shows the number of messages that are waiting. Message key 22 and Light source 48 may be formed in other appropriate manners, such as that disclosed in copending U.S. application Ser. No. 09/281, 396, filed Mar. 30, 1999, which is hereby incorporated by reference in its entirety as if fully set forth herein.

FIG. 3 shows a perspective view of receptacle 32. Receptacle 32 may be made out of any type of non-conducting plastic or other non-conducting material that is sturdy and durable. Receptacle 32 may define opening 60, which may be configured to receive selective connector 80 (see FIG. 4). Receptacle 32 may comprise a plurality of conductors 68 that may partially define opening 60. Conductors 68 may be made of copper or other suitable conductive material. Conductors 68 may be capable of electrically communicating with selective connector 80 when selective connector 80 is inserted into receptacle 32. Receptacle 32 may comprise non-conducting columns 66, which separate conductors 68 from each other. Non-conducting columns 66 may be made of the same material as receptacle 32 or may be made of different non-conducting material.

Receptacle 32 may be in electrical communication with a plurality of data lines, in the form of input conductors 62, that make up data input cable 8, which may in turn be connected to a data input line, such as through a port on the back of a telephone set. Input conductors 62 may be arranged in, for example, twisted pair format. Input conductors 62 may be arranged in a first order, for example, according to the standard of an RJ-45 connector. As shown, the first order reflects half of the conductors that make up an RJ-45 connector arranged in conformity with EIA/TIA 568A wiring standards in which the green input conductor transmits, the orange conductor receives, and the blue and brown conductors are not used. Input conductors 62 may comprise data input cable 8, which may be made of category 5 or any appropriate flexible, yet durable, material.

Figure 5A:
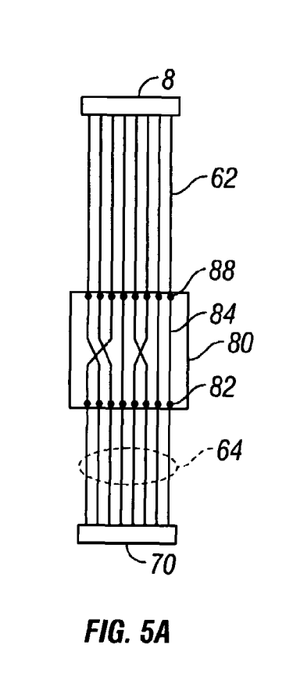
FIGS. 5a, 5b, and 5c show schematics of three different selective connector embodiments.
Figures 5B, 5C:
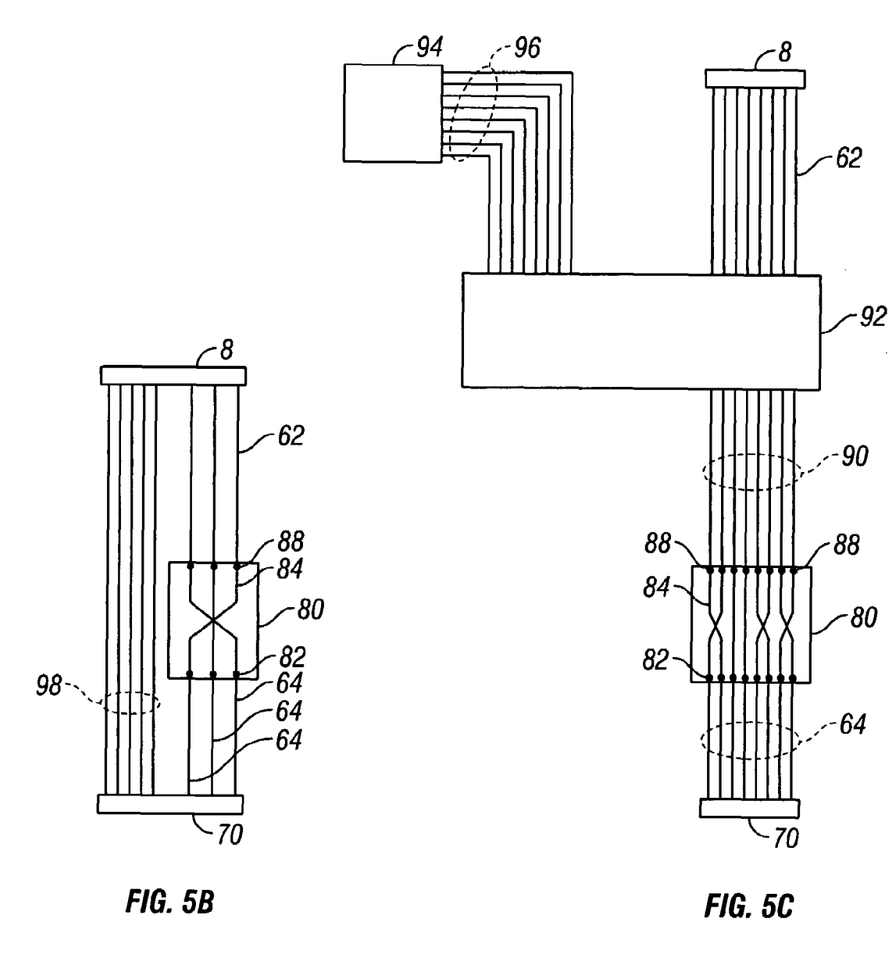

Input conductors 62 may also be in electrical communication with a local area network switch 92 located in the telephone set housing (see FIG. 5c). Local area network conductors 90 (see FIG. 5c) may be in electrical communication with receptacle 32 and the local area network switch 92. Local area network switch 90 may be an Ethernet switch, and could include a Layer 2 switch, a bridge or a hub, any of which could be implemented on a single chip with or without corresponding support chips. Local area network switch 90 may be in electrical communication with a voice over IP controller 94 by voice over IP conductors 96 (see FIG. 5c).

Receptacle 32 may be in electrical communication with a plurality of data lines, such as output conductors 64, which may form data output cable 70. Output conductors 64 may be arranged in, for example, twisted pair format. Output conductors 64 may be arranged in a second order that differs from the order of input conductors 62. As shown, the first order reflects half of the conductors that make up an RJ-45 connector arranged in conformity with EIA/TIA 568A wiring standards in which the green output conductor transmits, the orange conductor receives, and the blue and brown conductors are not used. The first order need not be the same as, and preferably is different than, the second order. Output conductors 64 may comprise data output cable 70, which may be made of category 5 or any appropriate flexible, yet durable, material. Output conductors 64 may be in electrical communication with a device that is capable of sending and receiving data via a wireless medium.

While the order of the conductors is described with reference to the color of standard wiring schemes, the ordering is to be referenced with respect to the particular signal carried by each conductor. Thus, for example, the plug allows the transmit line on the data input cable 8 to be connected to the transmit line on the data output cable 70 when a key is inserted into receptacle 32, so that a user may then operate the high-speed capability of the telephone satisfactorily because each input line is matched to its corresponding output line.

Figure 4:
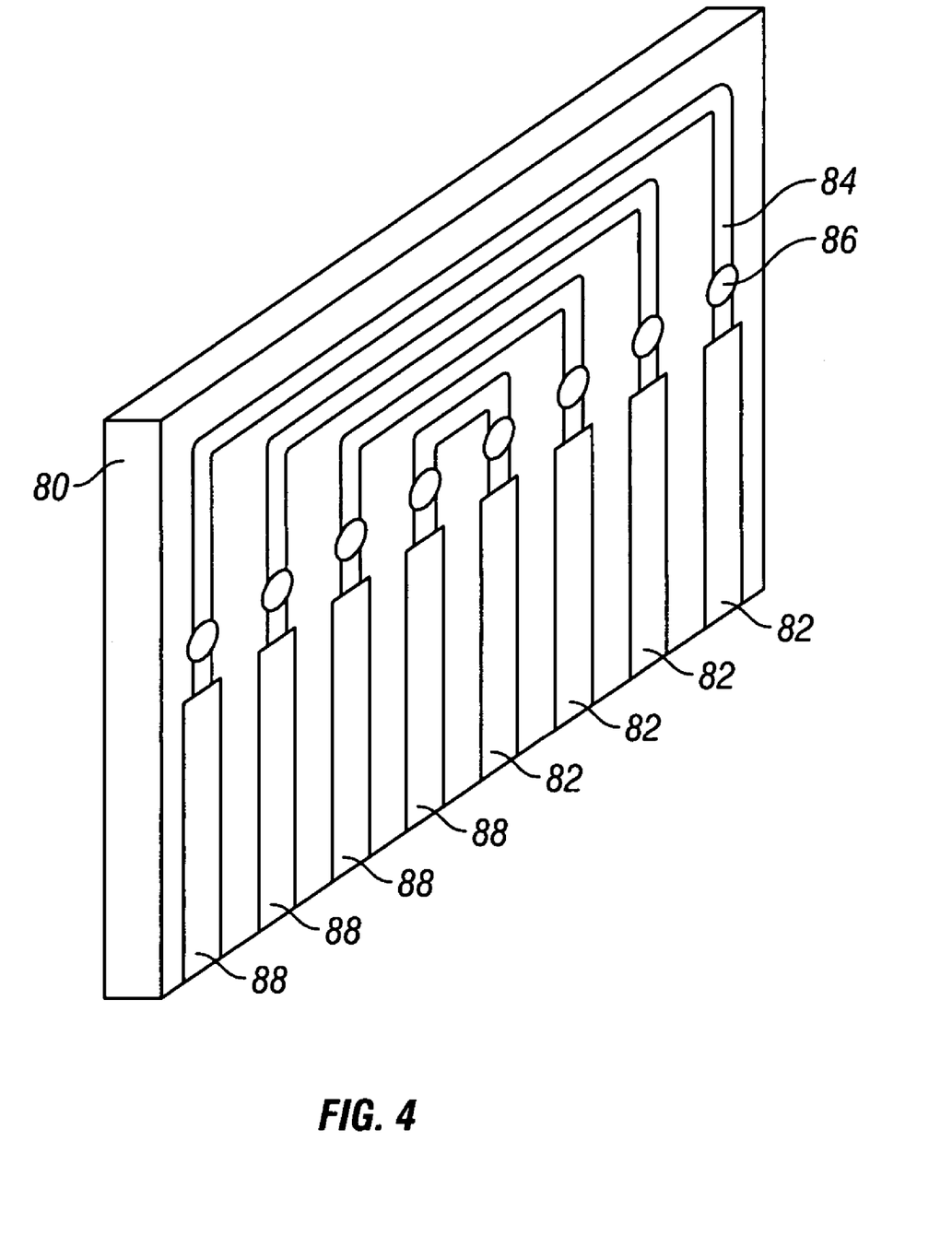
FIG. 4 shows a perspective view of the selective connector.

FIG. 4 shows a perspective view of selective connector 80. Selective connector 80 may be made of substantially flat substrate of FR4 or other materials out of which substrates are commonly made. Selective connector 80 may comprise a plurality of input conductor pads 88, a plurality of output conductor pads 82, vias 86, and traces 84.

Input conductor pads 88 may be made of copper or other suitable conductive material. Each input conductor pad 88 may be configured to electrically communicate with a selected input conductor 62 (see FIG. 3). This may be done by placing an input conductor pad 88 in electrical communication with a conductor 68 of receptacle 32, which is also placed in electrical communication with the corresponding input conductor 62.

Each input conductor pad 88 may be in electrical communication with a trace 84. Traces 84 may be made of copper or other conductive material and may be covered with, for example, a thin layer of glass epoxy to protect them from damage. Traces 84 may exist on a single plane or on multiple planes. When traces 84 exist on multiple planes, such as on opposed sides of selective connector 80, vias 86 may be used to place a trace 84 in electrical communication with a selected corresponding trace 84. Also, vias 86 may be provided so that pads may be provided on both sides of selective connector 80 so as to provide additional conductivity and better passage of signals through selective connector 80, especially after time has allowed for contamination or oxidation of the conductors.

Each trace 84 that is in electrical communication with an input conductor pad 88 is also in electrical communication with an output conductor pad 82. The input conductor pads 88 may be on an opposite surface of selective connector 80 than output conductor pads 82. Output conductor pads 82 may be made of copper or other suitable material. Each output conductor pad 82 may be configured to electrically communicate with a corresponding output conductor 64. This may be done by placing an output conductor pad 82 in electrical communication with a conductor 68 of receptacle 32 (see FIG. 3), which is also placed in electrical communication with the corresponding output conductor 64.

Selective connector 80 may be configured to connect input conductors 62, which are arranged in a first order, to output conductors 64, which are arranged in a second order that differs from the first order. For example, suppose four input conductors 62 were placed in electrical communication with four input conductor pads 88, numbered (1) through (4), in the following order: (1) configured to transmit a signal, (2) not used, (3) not used, and (4) configured to receive a signal. Further suppose that four output conductors 64 were placed in electrical communication with four output conductor pads 82, numbered (5) through (8), in the following order: (5) not used, (6) not used, (7) configured to receive a signal, and (8) configured to transmit a signal. In such a situation, traces 84 on selective connector 80 may be configured to enable electrical communication between the input conductor pads 88 and the corresponding output conductor pads 82. Namely, selective connector 80 may be configured to enable electrical communication between (1) and (8), (2) and (5), (3) and (6), and (4) and (7).

Other arrangements can also be used. For instance, the selective connector could simply provide a straight connection without any reordering of data lines. However, cross-over connections such as that shown in FIG. 4 help make piracy of the feature more difficult. Also the cross-over connections could literally cross over each other, or be reordered in another manner such as that shown in FIG. 4. The connection could also be implemented by structures other than a simple substrate. In addition, the selective connector may be provided initially with the telephone set, and apparatus may be provided to cause the selective connector to connect the input lines with corresponding output lines.

FIGS. 5*a*, 5*b*, and 5*c* show schematic drawings that describe examples using a selective connector 80. FIG. 5*a* shows a basic configuration in which eight input conductors 62 proceed from data input cable 8 and electrically communicate with input conductor pads 88 on selective connector 80. Traces 84 connect input conductor pads 88 to output conductor pads 82 so that input conductors 62 are in electrical communication with their corresponding output conductors 64, which proceed into data output cable 70.

FIG. 5*b* shows a similar configuration in which three input conductors 62 and five pass-through conductors 98 proceed from data input cable 8. The three input conductors 62 electrically communicate with input conductor pads 88 on selective connector 80. Those three input conductor pads 88 electrically communicate with corresponding output conductor pads 82 so that the three input conductors 62 are in electrical communication with their corresponding output conductors 64, which proceed into data output cable 70. The five pass-through conductors 98 simply proceed from data input cable 8 and into data output cable 70.

FIG. 5*c* shows a more complex configuration in which local area network switch 92 electrically communicates alternately between voice over IP controller 94 and data input cable 8. Voice over IP controller 94 electrically communicates with local area network switch 92 through conductors 96. Data input cable 8 electrically communicates with local area network switch 92 through input conductors 62. Local area network switch 92 transmits or receives data between selective connector 80 and the other two components through local area network conductors 90. Those local area network conductors 90 electrically communicate with input conductor pads 88 on selective connector 80. Traces 84 connect input conductor pads 88 to output conductor pads 82 so that local area network conductors 90 are in electrical communication with their corresponding output conductors 64, which proceed into data output cable 70.

In this manner, a single telephone set can be connected to a CAT 5 line to a hotel room or office, and the telephone set may provide both voice over IP functionality through the telephone set itself, and high-speed data functionality through a high-speed data port. The switch may also be given prioritizing functionality so that, for example, voice data packets from the voice over IP controller 94 are given precedence over packets from data output cable 70. This functionality may be implemented by any number of apparatuses and methods known to a skilled artisan.

Figure 6A:
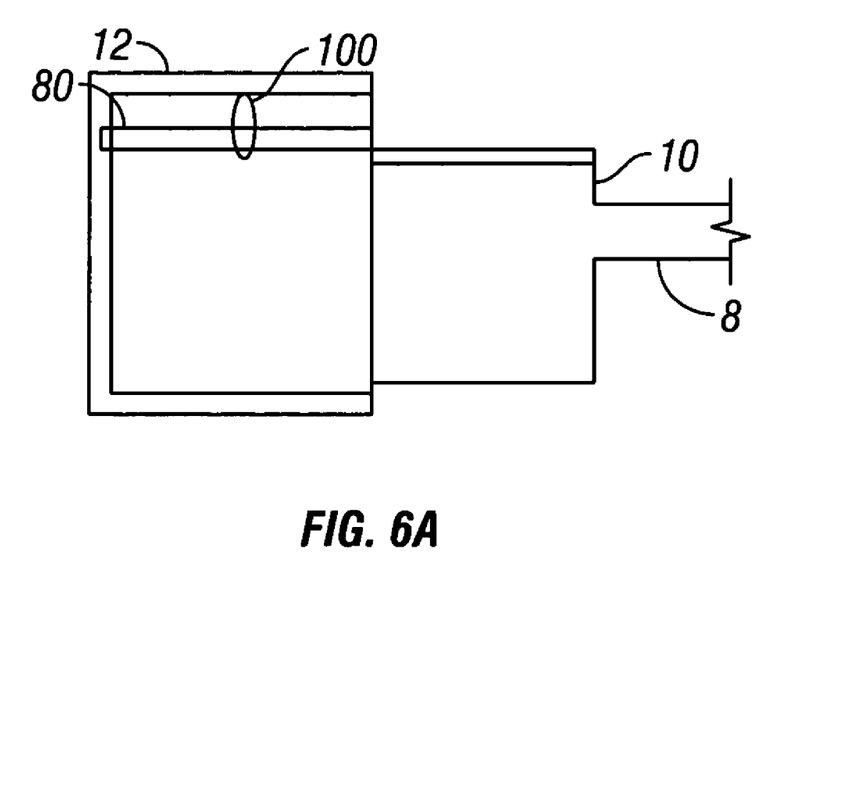
FIG. 6a shows a side view and 6b shows a front view of a fourth selective connector embodiment.
Figure 6B:
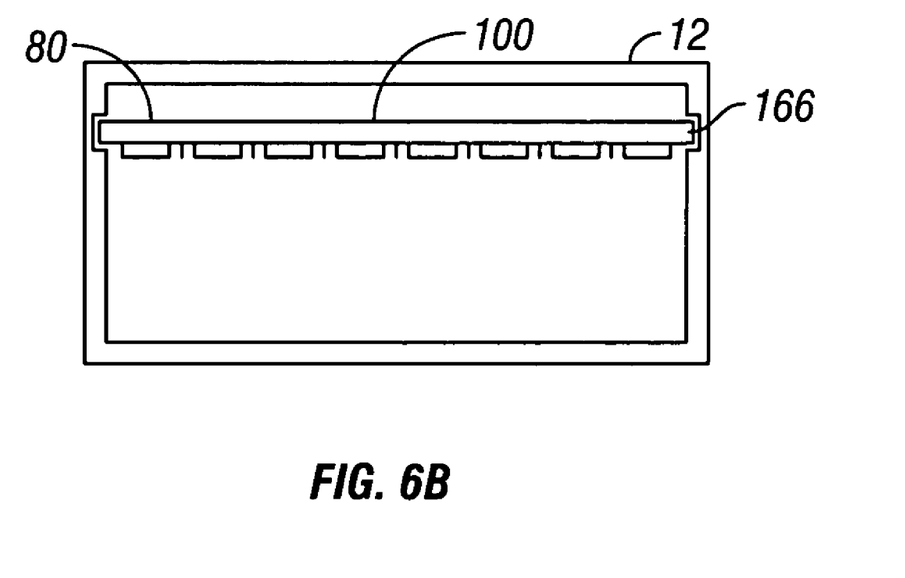

FIGS. 6*a* and 6*b* show side and top views, respectively, of an embodiment in which high-speed port 12 may be configured to receive selective connector 80. In such an embodiment, output conductors 64 may be configured to contact corresponding conductors on selective connector 80, such as at pads on the top of selective connector 80. Vias 86 may be provided through selective connector 80 so that further conductive traces may be provided on a lower surface of selective connector 80. The traces may also cross over each other to provide for more protection against piracy.

Selective connector 80 may be configured and sized so that it slips into high-speed port 12 in recesses formed by rails 102. The selective connector 80 may be slightly flexible and may cantilever slightly out from the ends of rails 102. Rails 102 may also be located so that high-speed port 12 may receive a female RJ-45 connector. In this manner, the top edge of the female RJ-45 connector may contact the bottom edge of selective connector 80 as the female RJ-45 connector is slid into high-speed port 12, and may push the cantilevered portion of selective connector 80 up slightly so that the tension in selective connector 80 holds conductive pads on selective connector 80 is tight communicative contact with the conductors on the female RJ-45 connector. In addition, a retainer, such as in the form of flexible balls 100, may be provided in high-speed port 12 to prevent selective connector 80 from unintentionally sliding out of high-speed port 12. Balls 100 may mate with corresponding recesses in the side of selective connector 80. Other appropriate mechanisms for restraining selective connector 80 may also be employed.

It will be understood that various modifications may be made without departing from the spirit and scope of the invention. For example, the various mechanisms for providing selective connection between input data lines and output data lines could be arranged in a different manner or could contain additional or alternative components. Also, the ability to provide both high-speed data access and phone access to form a single telephone set, including by using voice over IP, can be carried out using other mechanisms. Also, the particular components may be supplemented and rearranged, and their functions may be combined or carried out by different components. Accordingly, other embodiments are within the scope of the following claims.

What is claimed is:

1. A system having a selective connector for use with a data networking device, the selective connector comprising
   a) a substrate sized and adapted to be received in an open receptacle in a device,
   b) a first plurality of conductors arranged in a first order on the substrate,
   c) a second plurality of conductors arranged on the substrate in a second order that differs from the first order, and
   d) a conductor cross-over that connects each of the first plurality of conductors to matched corresponding conductors in the second plurality of conductors,
   wherein the substrate has a first edge, and the first plurality of conductors and second plurality of conductors include contact pads proximate to the first edge.

2. The system of claim 1, further comprising:
   a) a data input cable having a first plurality of data lines arranged in a first order to contact the first plurality of conductors, and
   b) a data output cable having a second plurality of data lines arranged in a second order that differs from the first order to match the second plurality of conductors so as to bridge signals from the data input cable to the data output cable.

3. The system of claim 2, further comprising a output jack in electrical communication with the data output cable.

4. The system of claim 3, wherein the output jack comprises a female RJ-45 connector.

5. The system of claim 2, further comprising an input jack in electrical communication with the data input cable.

6. The system of claim 5, wherein the input jack and the output jack each comprises a female RJ-45 connector.

7. The system of claim 2, further comprising a knockout panel on an outer surface of the telephone over the first jack.

8. The system of claim 2, further comprising a receptacle in a telephone in electrical communication with the data input cable and the data output cable and adapted to receive the selective connector.

9. The system of claim 8, wherein the receptacle is accessible from a top surface of the telephone.

10. The system of claim 2, further comprising a network switch mounted in a telephone in electrical communication with the data input cable and with the data output cable, and configured to pass data intended for the data output cable to the data output cable.

11. The system of claim 10, wherein the switch comprises a hub.

12. The system of claim 10, wherein the switch selectively passes data to the data output cable.

13. The system of claim 12, further comprising a voice over IP controller in communication with the switch.

14. The system of claim 13, wherein the voice over IP controller and the switch are located on a single chip.

15. The system of claim 1, further comprising:
   a) a main unit comprising a telephone housing;
   b) a hand set;
   c) a data input cable;
   d) a data output port; and
   e) a receptacle configured to receive the selective connector in electrical communication with the data input cable and the data output port, and to connect data lines from the data input cable arranged in a first order, to corresponding matched data lines from the data output port arranged in a second order that differs from the first order.

16. The system of claim 15, wherein the receptacle is accessible through a passage formed in a top surface of the housing.

17. The system of claim 15, further comprising a message alert and retrieval device mounted in the housing unit that combines into a single apparatus a message key adapted to permit one-touch message retrieval, and a light source that indicates when a message is waiting.

18. The selective connector of claim 1, wherein the substrate has a first substantially planar surface supporting the first plurality of conductors and a second substantially planar surface opposed to the first surface supporting the second plurality of conductors.

19. The selective connector of claim 18, further comprising vias in the substrate connecting the first plurality of conductors to the second plurality of conductors.

20. The selective connector of claim 1, wherein the substrate has a first substantially planar surface and the first plurality of conductors and second plurality of conductors are located on the first surface.

21. The selective connector of claim 1, wherein the substrate is sized to fit inside an RJ-45 jack and the second plurality of conductors are configured to contact corresponding conductors of an RJ-45 plug.

* * * * *